(12) United States Patent
Huang et al.

(10) Patent No.: US 9,851,542 B2
(45) Date of Patent: Dec. 26, 2017

(54) IMAGING LENS

(71) Applicant: Young Optics Inc., Hsinchu (TW)

(72) Inventors: Wei-Hao Huang, Hsinchu (TW);
Kuo-Chuan Wang, Hsinchu (TW);
Bing-Ju Chiang, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 0 days.

(21) Appl. No.: 15/093,759

(22) Filed: Apr. 8, 2016

(65) Prior Publication Data
US 2017/0293118 A1    Oct. 12, 2017

(51) Int. Cl.
| G02B 13/14 | (2006.01) |
| G02B 7/00 | (2006.01) |
| G02B 5/20 | (2006.01) |
| G02B 13/18 | (2006.01) |
| G02B 7/02 | (2006.01) |
| H04N 5/33 | (2006.01) |
| G02B 15/177 | (2006.01) |
| H04N 5/232 | (2006.01) |

(52) U.S. Cl.
CPC ........... *G02B 13/146* (2013.01); *G02B 5/208* (2013.01); *G02B 7/006* (2013.01); *G02B 7/023* (2013.01); *G02B 13/14* (2013.01); *G02B 13/18* (2013.01); *G02B 15/177* (2013.01); *H04N 5/23296* (2013.01); *H04N 5/33* (2013.01)

(58) Field of Classification Search
CPC ...... G02B 7/006; G02B 7/023; G02B 13/146; G02B 13/18; G02B 5/208; G02B 15/177; G02B 13/14; H04N 5/33; H04N 5/23296

USPC .................................................. 359/891, 691
See application file for complete search history.

(56) References Cited

U.S. PATENT DOCUMENTS

| 7,177,094 | B2 | 2/2007 | Mihara et al. | |
| 7,345,827 | B1* | 3/2008 | Tang | G02B 7/08 359/704 |
| 7,567,288 | B2 | 7/2009 | Mihara et al. | |
| 8,040,614 | B2 | 10/2011 | Matsunaga et al. | |
| 9,146,389 | B2* | 9/2015 | Han | G02B 15/177 |
| 9,170,398 | B2* | 10/2015 | Sudoh | G02B 9/62 |
| 2010/0182677 | A1* | 7/2010 | Wang | G02B 9/64 359/356 |
| 2011/0051260 | A1* | 3/2011 | Nakayama | G02B 5/205 359/738 |
| 2014/0285903 | A1* | 9/2014 | Suzuki | G02B 9/64 359/691 |
| 2014/0320978 | A1* | 10/2014 | Chou | G02B 15/177 359/689 |
| 2015/0326792 | A1* | 11/2015 | Yamasaki | H04N 5/2253 348/240.3 |
| 2015/0338621 | A1* | 11/2015 | Jang | G02B 15/161 359/691 |

(Continued)

*Primary Examiner* — William R Alexander
(74) *Attorney, Agent, or Firm* — JCIPRNET

(57) ABSTRACT

An imaging lens including a first lens group, a second lens group, and an aperture stop is provided. The first lens group is disposed between an object side and an image side. The second lens group is disposed between the first lens group and the image side. The aperture stop is disposed between the first lens group and the second lens group. The imaging lens includes at least three cemented lenses, each of the cemented lenses includes at least one lens having non-zero refractive power, and at least one lens of each of the cemented lenses has an Abbe number greater than 80.

21 Claims, 7 Drawing Sheets

(56) References Cited

U.S. PATENT DOCUMENTS

| | | | |
|---|---|---|---|
| 2016/0112613 A1* | 4/2016 | Lee ................... | H04N 5/23245 348/164 |
| 2016/0127659 A1* | 5/2016 | Kawasaki .......... | H04N 5/23245 348/164 |
| 2017/0010438 A1* | 1/2017 | Sun .................... | G02B 13/0035 |
| 2017/0023781 A1* | 1/2017 | Wang .................. | G02B 15/177 |

\* cited by examiner

IMAGING LENS

BACKGROUND OF THE INVENTION

1. Field of the Invention

The invention generally relates to an optical lens and, in particular, to an imaging lens.

2. Description of Related Art

Along with development of modern video technology, image devices such as digital video cameras (DVC), digital cameras (DC), and surveillance cameras are widely used, and are widely applied in various domains. A core element of these image devices is an imaging lens, which is configured to clearly form an image on an image sensor such as a charge coupled device (CCD) or a complementary metal oxide semiconductor (CMOS) image sensor.

In the application of a surveillance lens, it may be required that the position of the focus in the daytime is the same as that at night. In a conventional surveillance camera, an infrared cut-off filter is put on the light path in a surveillance lens in the daytime, and the infrared (IR) cut-off filter is replaced by an air layer to provide an appropriate optical path length (OPL), so as to achieve the effect that the position of the focus in the daytime is the same as that at night. However, in the circumstance that visible light and IR light both exist, local image blur may occur due to the position of the focus of IR light and the position of the focus of visible light being not the same at the same time.

SUMMARY OF THE INVENTION

Accordingly, the invention is directed to an imaging lens, which may achieve the effect that the position of the focus of IR light and the position of the focus of visible light are substantially the same at the same time.

According to an embodiment of the invention, an imaging lens including a first lens group, a second lens group, an aperture stop, a first optical element, a second optical element, and a switching unit is provided. The first lens group is disposed between an object side and an image side. The second lens group is disposed between the first lens group and the image side. The aperture stop is disposed between the first lens group and the second lens group. The first optical element and the second optical element are disposed between the first lens group and the image side. The switching unit is disposed between the first lens group and the image side and connected to the first optical element and the second optical element. The switching unit is configured to switch the first optical element or the second optical element into a light path. The first optical element is an invisible light filter. The imaging lens includes at least three cemented lenses, and each of the cemented lenses includes at least one lens having non-zero refractive power.

According to an embodiment of the invention, an imaging lens including a first lens group, a second lens group, an aperture stop, a first optical element, a second optical element, and a switching unit is provided. The first lens group is disposed between an object side and an image side. The second lens group is disposed between the first lens group and the image side. The aperture stop is disposed between the first lens group and the second lens group. The first optical element and the second optical element are disposed between the first lens group and the image side. The switching unit is connected to the first optical element and the second optical element. The switching unit is configured to switch the first optical element or the second optical element into a light path from the first lens group to the image side. The first optical element is an invisible light filter. When an incident light having a wavelength of 850 nm passes through the imaging lens to from an image on the image side, a focus shift of the image with respect to green light is less than 0.015 mm, or, for example, less than 0.01 mm.

According to an embodiment of the invention, an imaging lens including a first lens group, a second lens group, and an aperture stop is provided. The first lens group is disposed between an object side and an image side. The second lens group is disposed between the first lens group and the image side. The aperture stop is disposed between the first lens group and the second lens group. The imaging lens includes at least three cemented lenses, each of the cemented lenses includes at least one lens having non-zero refractive power, and at least one lens of each of the cemented lenses has an Abbe number greater than 80.

In the imaging lens according to embodiments of the invention, since the cemented lenses are used, or since a focus shift of light having the wavelength of 850 nm with respect to green light is less than 0.015 mm, or, for example, less than 0.01 mm, the imaging lens may achieve the effect that the position of the focus of IR light and the position of the focus of visible light are substantially the same at the same time. Consequently, even in the circumstance that visible light and IR light both exist, the position of the focus of IR light and the position of the focus of visible light may be substantially the same at the same time, so that local image blur may not occur.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
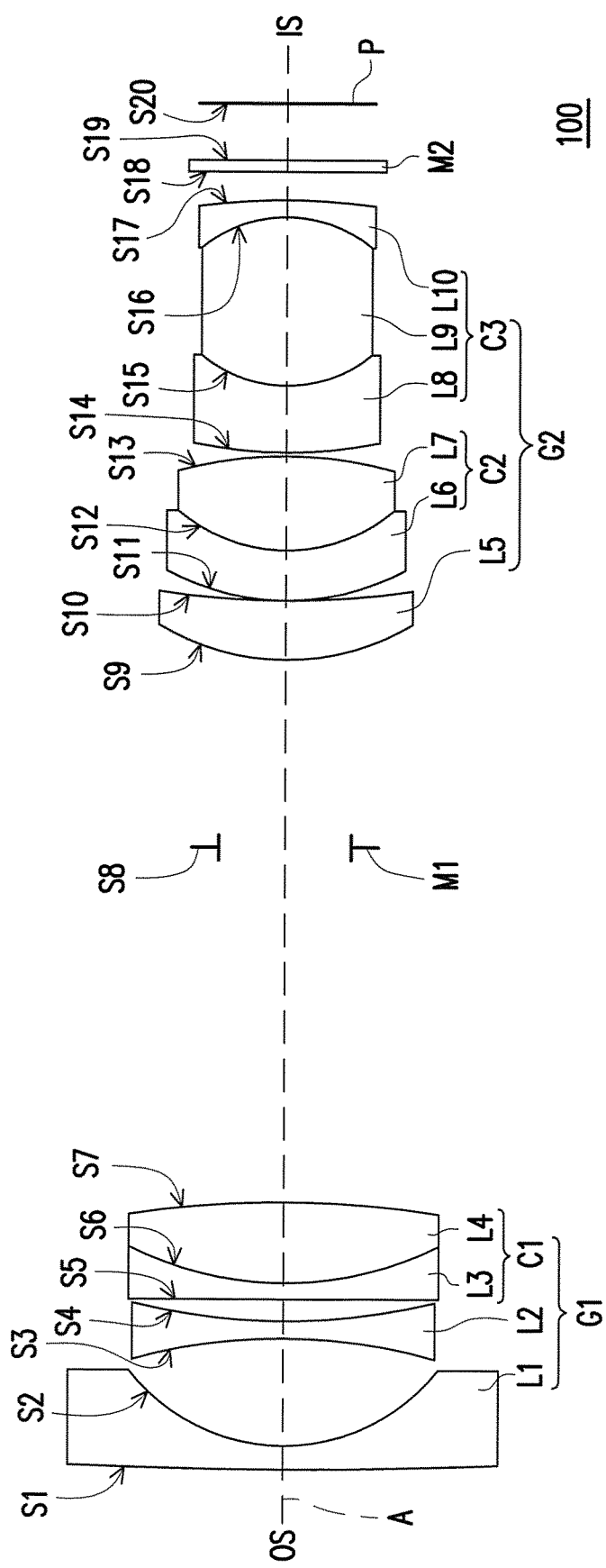
FIG. 1A is a schematic cross-sectional view of an imaging lens according to an embodiment of the invention.

Reference will now be made in detail to the present embodiments of the invention, examples of which are illustrated in the accompanying drawings. Wherever possible, the same reference numbers are used in the drawings and the description to refer to the same or like parts.

Figure 1B:
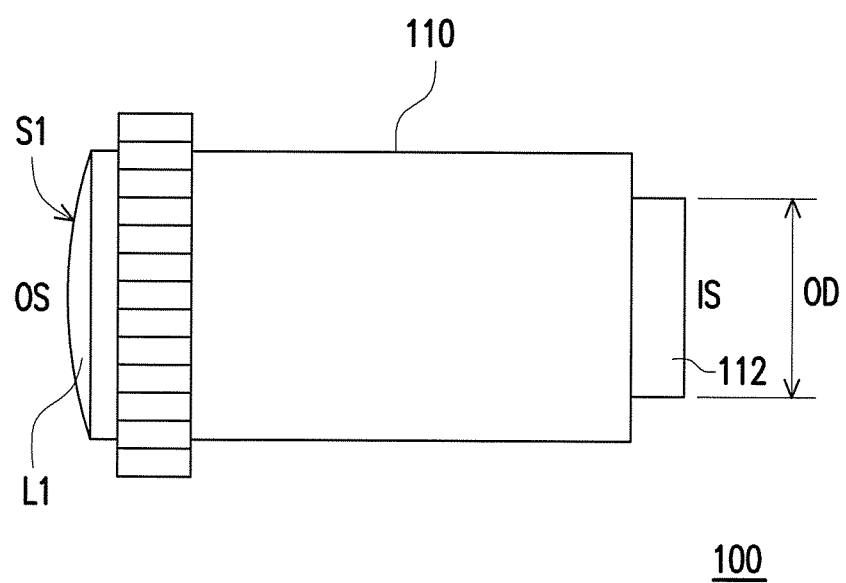
FIG. 1B is a schematic side view showing the appearance of the imaging lens in FIG. 1A.

FIG. 1A is a schematic cross-sectional view of an imaging lens according to an embodiment of the invention, and FIG. 1B is a schematic side view showing the appearance of the imaging lens in FIG. 1A. Referring to FIGS. 1A and 1B, an imaging lens 100 in this embodiment includes a first lens group G1, a second lens group G2, and an aperture stop M1. The first lens group G1 is disposed between an object side OS and an image side IS. The second lens group G2 is disposed between the first lens group G1 and the image side IS. The aperture stop M1 is disposed between the first lens group G1 and the second lens group G2.

In this embodiment, the first lens group G1 includes a first lens L1, a second lens L2, a third lens L3, and a fourth lens L4 arranged in sequence from the object side OS towards the image side IS, and the second lens group G2 includes a fifth lens L5, a sixth lens L6, a seventh lens L7, an eighth lens L8, a ninth lens L9, and a tenth lens L10 arranged in sequence from the object side OS towards the image side IS. The refractive powers of the first through tenth lenses L1-L10 are negative, negative, negative, positive, positive, negative, positive, negative, positive, and negative, respectively. In this embodiment, the first lens group G1 is a focusing group, and the second lens group G2 is a zooming group.

The imaging lens 100 includes at least three cemented lenses (e.g. the cemented lenses C1, C2, and C3) to reduce color aberration, each of the cemented lenses C1, C2, C3 includes at least one lens having non-zero refractive power, and at least one lens of each of the cemented lenses C1, C2, C3 has an Abbe number greater than 80. The first lens group G1 may include at least one cemented lens, the second lens group G2 may include at least two cemented lenses, and at least one of the at least two cemented lenses included by the second lens group G2 is a triple cemented lens. Each of the cemented lenses may include at least two lenses. Specifically, in this embodiment, the third lens L3 and the forth lens L4 form the cemented lens C1, which is a double cemented lens. The sixth lens L6 and the seventh lens L7 form the cemented lens C2, which is a double cemented lens. The eighth lens L8, the ninth lens L9, and the tenth lens L10 form the cemented lens C3, which is a triple cemented lens. Moreover, in this embodiment, each of the third lens L3, the seventh lens L7, and the ninth lens L9 has an Abbe number greater than 80.

In the imaging lens 100 in this embodiment, the cemented lenses C1, C2, and C3 are used, and at least one lens of each of the cemented lenses C1, C2, C3 has an Abbe number greater than 80, the color aberration of light in the wavelength range of 435 nm to 850 nm is effectively reduced, and the imaging lens 100 may achieve the effect that the position of the focus of IR light and the position of the focus of visible light are substantially the same simultaneously. Consequently, even in the circumstance that visible light and IR light both exist, the position of the focus of IR light and the position of the focus of visible light may be substantially the same, so that local image blur may not occur. As a result, even when an IR cut-off filter is not used in the imaging lens 100, the imaging lens 100 may achieve the effect that the position of the focus in the daytime is substantially and naturally the same as that at night, and the phenomenon of blue or violet edges of the image formed by the imaging lens 100 is effectively reduced and not obvious.

In this embodiment, when an incident light having a wavelength of 850 nm passes through the imaging lens 100 to from an image on the image side IS, a focus shift of the image with respect to green light, for example, light having a wavelength of 546 nm, is less than 0.015 mm, or, for example, less than 0.01 mm. Moreover, in this embodiment, when an incident light having a wavelength of 435 nm passes through the imaging lens 100 to form an image on the image side IS, a lateral color aberration of the image with respect to light having a wavelength of 587 nm is less than 3 microns, so that the phenomenon of blue or violet edges of the image formed by the imaging lens 100 is effectively reduced and not obvious.

The imaging lens 100 may include at least one aspheric lens, so as to reduce spherical aberration, coma aberration, astigmatism, curvature of field, and distortion, and achieve high resolution. For example, the second lens group G2 may include an aspheric lens. In this embodiment, the fifth lens L5 is an aspheric lens, and the first through fourth lenses L1-L4 and the sixth through tenth lenses L6-L10 are spherical lenses.

In this embodiment, the first lens L1 is a negative meniscus lens having a convex surface facing the object side OS, the second lens L2 is a biconcave lens, the third lens L3 is a plane-concave lens having a concave surface facing the image side IS, the fourth lens L4 is a biconvex lens, the fifth lens L5 is a positive meniscus lens having a convex surface facing the object side OS, the sixth lens L6 is a negative meniscus lens having a convex surface facing the object side OS, the seventh lens L7 is a biconvex lens, the eighth lens L8 is a negative meniscus lens having a convex surface facing the object side OS, the ninth lens L9 is a biconvex lens, and the tenth lens L10 is a negative meniscus lens having a convex surface facing the image side IS. Moreover, in this embodiment, the imaging lens 100 further includes a cover glass M2 disposed between the second lens group G2 and an image sensor P at the image side IS and configured to protect the image sensor P.

An embodiment of the imaging lens 100 is given hereinafter. However, the invention is not limited to the data listed in Tables 1 and 2.

TABLE 1

| Surface | Curvature Radius (mm) | Interval (mm) | Refractive index | Abbe Number | Remarks |
|---|---|---|---|---|---|
| S1 | 310.20 | 0.80 | 1.92 | 18.90 | L1 |
| S2 | 7.14 | 3.79 | | | |
| S3 | −21.17 | 0.60 | 1.77 | 49.64 | L2 |
| S4 | 21.17 | 0.82 | | | |
| S5 | Infinity | 0.60 | 1.50 | 81.61 | L3 |
| S6 | 12.65 | 2.83 | 1.92 | 20.88 | L4 |
| S7 | −35.90 | 12.74 | | | |
| S8 | Infinity | 6.61 | | | M1 |
| S9 | 8.77 | 2.11 | 1.58 | 59.20 | L5 |
| S10 | 45.06 | 0.10 | | | |
| S11 | 9.54 | 1.70 | 1.90 | 31.32 | L6 |
| S12 | 5.89 | 3.39 | 1.44 | 95.10 | L7 |
| S13 | −12.45 | 0.10 | | | |
| S14 | 14.97 | 2.44 | 1.85 | 32.31 | L8 |
| S15 | 4.99 | 5.93 | 1.50 | 81.61 | L9 |
| S16 | −4.99 | 0.60 | 1.65 | 33.84 | L10 |
| S17 | −27.76 | 1.02 | | | |
| S18 | Infinity | 0.40 | 1.52 | 64.14 | M2 |
| S19 | Infinity | 2.00 | | | |
| S20 | Infinity | 0.00 | | | P |

In Table 1, the interval refers to a straight distance along the optical axis A of the imaging lens 100 between two neighboring surfaces. For example, the interval of surface S1 is the straight distance along the optical axis A between surface S1 and surface S2. The corresponding thickness, refractive index, and Abbe number of each lens in the Remarks column refers to the values, in the same row, corresponding to the interval, refractive index, and Abbe number. Moreover, in Table 1, the surfaces S1 and S2 are two surfaces of the first lens L1. The surfaces S3 and S4 are two surfaces of the second lens L2, et cetera. The surface S8 is the aperture stop M1. The surfaces S18 and S19 are two surfaces of the cover glass M2. The surface S20 is the image plane on the image sensor P.

Table 1 shows the data of the imaging lens 100 at the wide-end. When the imaging lens 100 is at the tele-end, the interval between the surface S7 and the surface S8 along the optical axis A is changed to 2.49, the interval between the surface S8 and the surface S9 along the optical axis A is changed to 0.1, and the interval between the surface S17 and the surface S18 along the optical axis A is changed to 7.53.

The surfaces S9 and S10 of the imaging lens 100 are aspheric surfaces and may be represented by the following formula (1):

$$Z = \frac{cy^3}{1+\sqrt{1-(1+K)c^2y^2}} + A_2y^2 + A_4y^4 + A_6y^6 + A_8y^8 + A_{10}y^{10}$$ (formula 1)

In the formula, Z is a sag in the direction of the optical axis A, and c is the inverse of the radius of an osculating sphere, i.e. the inverse of the curvature radii (e.g., the curvature radii of the surfaces S9 and S10 in Table 1) close to the optical axis A. K is a conic coefficient, y is an aspheric height, and $A_2$ to $A_{10}$ are aspheric coefficients. The parameter values of the surfaces S9 and S10 are listed in Table 2. In this embodiment, K and $A_2$ are both zero.

TABLE 2

| Aspheric Parameter | S9 | S10 |
|---|---|---|
| $A_4$ | 5.596220E−05 | 4.221353E−04 |
| $A_6$ | −5.731411E−08 | 1.879864E−06 |
| $A_8$ | 9.451688E−08 | 8.921620E−08 |
| $A_{10}$ | −3.721501E−09 | −5.076777E−09 |

In this embodiment, the imaging lens 100 may include a barrel 110, and the first through tenth lenses L1-L10 are disposed inside the barrel 110. Moreover, the barrel 110 may have a joint 112 disposed between the second lens group G2 and the image side IS, and an outside diameter OD of the joint 112 is less than or equal to 14 inches.

In this embodiment, the second lens group G2 includes a cemented lens (for example, the cemented lens C3) nearest to the image side IS among lenses of the second lens group G2, and a ratio of a total length of the cemented lens C3 along the optical axis A (for example, the distance between the surfaces S14 and 17) to a total length of the second lens group G2 along the optical axis A (for example, the distance between the surfaces S9 and S17) is greater than 0.5. Moreover, in this embodiment, the first lens group G1 includes at least one lens having an Abbe number less than 20, for example, the first lens L1.

Figure 2A:
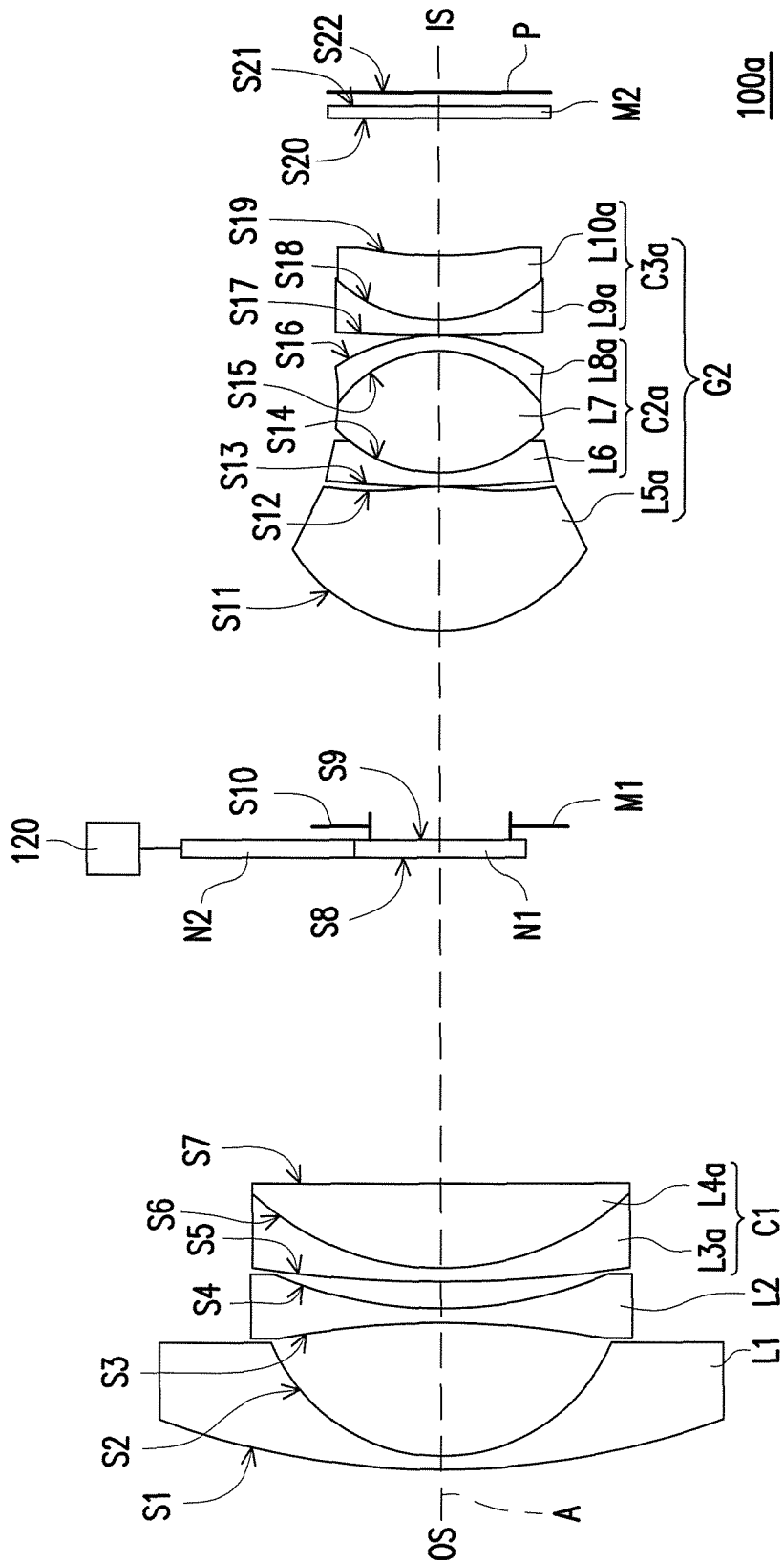
FIG. 2A is a schematic cross-sectional view of an imaging lens according to another embodiment of the invention when the first optical element thereof is switched into the light path in the imaging lens.
Figure 2B:
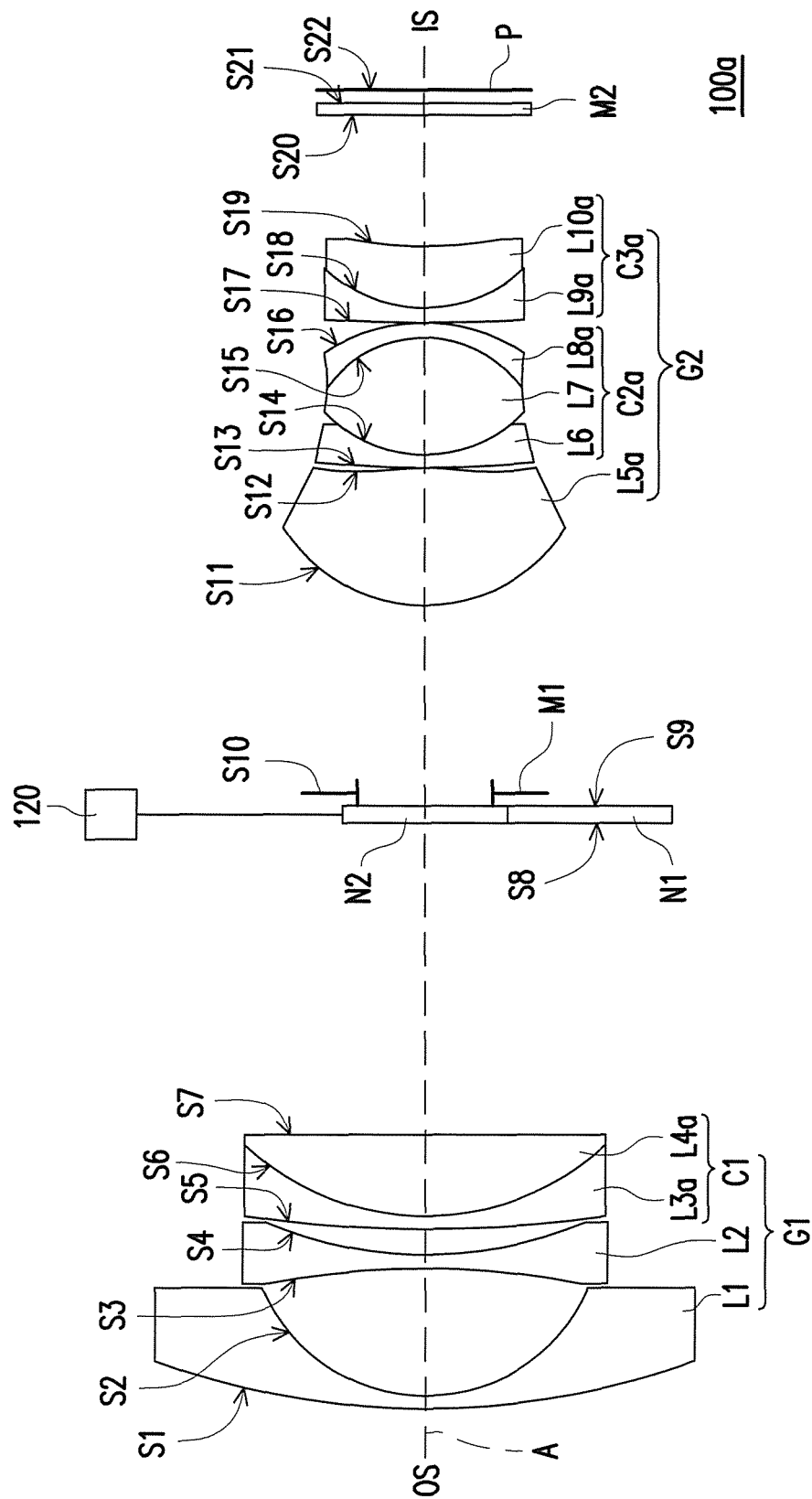
FIG. 2B is a schematic cross-sectional view of the imaging lens in FIG. 2A when the second optical element thereof is switched into the light path in the imaging lens.

FIG. 2A is a schematic cross-sectional view of an imaging lens according to another embodiment of the invention when the first optical element thereof is switched into the light path in the imaging lens, and FIG. 2B is a schematic cross-sectional view of the imaging lens in FIG. 2A when the second optical element thereof is switched into the light path in the imaging lens. Referring to FIGS. 2A and 2B, the imaging lens 100a in this embodiment is similar to the imaging lens 100 in FIGS. 1A and 1B, and the main difference therebetween is as follows. In this embodiment, the ninth lens L9a has negative refractive power, and the tenth lens L10a has positive refractive power. Moreover, in this embodiment, the sixth lens L6, the seventh lens L7, and the eighth lens L8a form the cemented lens C2a, and the ninth lens L9a and the tenth lens L10a form the cemented lens C3a. In addition, in this embodiment, the third lens L3a is a negative meniscus lens having a convex surface facing the object side OS, the fourth lens L4a is a positive meniscus lens having a convex surface facing the object side OS, the fifth lens L5a is a biconvex lens, the eighth lens L8a is a negative meniscus lens having a convex surface facing the image side IS, the ninth lens L9a is a negative meniscus lens having a convex surface facing the object side OS, and the tenth lens L10a is a positive meniscus lens having a convex surface facing the object side OS. In this embodiment, each lens in the double cemented lens in the second lens group G2 has an Abbe number less than 25, and the triple cemented lens in the second lens group G2 has a lens having an Abbe number greater than 80. For example, the Abbe number of each of the ninth lens L9a and the tenth lens L10a of the cemented lens C3a is less than 25, and the Abbe number of the seventh lens L7 in the cemented lens C2a is greater than 80.

In this embodiment, the imaging lens 100a further includes a first optical element N1, a second optical element N2, and a switching unit 120. The first optical element N1 and the second optical element N2 are disposed between the first lens group G1 and the image side IS. In this embodiment, the first optical element N1 and the second optical element N2 are disposed between the first lens group G1 and the second lens group G2. For example, the first optical element N1 and the second optical element N2 are disposed between the first lens group G1 and the aperture stop M1, as shown n FIGS. 2A and 2B.

The switching unit 120 is connected to the first optical element N1 and the second optical element N2. In this embodiment, the switching unit 120 is disposed between the first lens group G1 and the image side IS. The switching unit 120 is configured to switch the first optical element N1 or the second optical element N2 into a light path, for example, the light path between the first lens group G1 and the image side IS. In this embodiment, the switching unit 120 is an actuator, e.g. a motor, for moving the first optical element N1 and the second optical element N2. In this embodiment, the first optical element N1 is an invisible light filter, e.g. an IR cut-off filter, and the second optical element N2 is a light-transmissive element, e.g. an anti-reflection (AR) transparent plate.

In the daytime, the switching unit 120 switch the first optical element N1 into the light path from the first lens group G1 to the image side IS, as shown in FIG. 2A, so that IR light may be blocked by the first optical element N1. As a result, the image sensor P may sense the image of visible light, and the color of the image sensed by the image sensor P is right and not influenced by IR light in the environment. At night, the switching unit 120 switch the second optical element N2 into the light path from the first lens group G1 to the image side IS, as shown in FIG. 2B, so that IR light may be transmitted through the second optical element N2 and sensed by the image sensor P, so as to achieve a night vision function.

In this embodiment, a thickness of the first optical element N1 along a direction parallel to the optical axis A is substantially the same as a thickness of the second optical element N2 along the direction parallel to the optical axis A, so that the optical path length through the first optical element N1 is substantially the same as that through the second optical element N2. As a result, the imaging lens 100a may achieve the effect that the position of the focus in the daytime is substantially and naturally the same as that at night. The first optical element N1, the second optical element N2, and the switching unit 120 may also be integrated into the imaging lens 100 in FIGS. 1A and 1B to form a new embodiment of the imaging lens. Alternatively, in another embodiment, the imaging lens 100a includes the switching unit 120 and the first optical element N1 but does not include the second optical element N2, and the switching unit 120 switch the first optical element N1 into the light path in the imaging lens 100a in the daytime and switch the first optical element N1 out of the light path in the imaging lens 100a at night.

In this embodiment, the aperture stop M1 and any one of the first optical element N1 and the second optical element N2 switched into the light path in the imaging lens 100a are arranged along the optical axis A1 of the imaging lens 100a, so that rays passing through the aperture stop M1 may pass through one of the first optical element N1 and the second optical element N2 at a time.

An embodiment of the imaging lens 100a is given hereinafter. However, the invention is not limited to the data listed in Tables 3 and 4.

TABLE 3

| Surface | Curvature Radius (mm) | Interval (mm) | Refractive index | Abbe Number | Remarks |
| --- | --- | --- | --- | --- | --- |
| S1 | 28.03 | 0.50 | 1.88 | 40.77 | L1 |
| S2 | 6.45 | 4.70 | | | |
| S3 | −29.63 | 0.50 | 1.70 | 55.53 | L2 |
| S4 | 14.45 | 0.89 | | | |
| S5 | 42.85 | 0.50 | 1.50 | 81.61 | L3a |
| S6 | 9.36 | 2.99 | 1.85 | 30.06 | L4a |
| S7 | 381.33 | 12.55 | | | |
| S8 | Infinity | 0.10 | 1.52 | 64.14 | N1 |
| S9 | Infinity | 0.00 | | | |
| S10 | Infinity | 6.91 | | | M1 |
| S11 | 5.99 | 5.00 | 1.58 | 59.20 | L5a |
| S12 | −32.90 | 0.10 | | | |
| S13 | 33.52 | 0.50 | 1.72 | 34.71 | L6 |
| S14 | 4.86 | 4.28 | 1.44 | 95.10 | L7 |
| S15 | −4.27 | 0.50 | 1.60 | 38.03 | L8a |
| S16 | −6.72 | 0.10 | | | |
| S17 | 63.76 | 0.50 | 1.85 | 23.78 | L9a |
| S18 | 5.12 | 2.28 | 1.92 | 20.88 | L10a |
| S19 | 16.49 | 4.83 | | | |
| S20 | Infinity | 0.40 | 1.52 | 64.14 | M2 |
| S21 | Infinity | 0.51 | | | |
| S22 | Infinity | 0.00 | | | P |

In Table 3, the surfaces S8 and S9 are two surfaces of the first optical element N1, and the meaning of the surfaces S1-S7 and S10-S22 can be deduced by analogy from the description of Table 1 and are not repeated hereinafter.

Table 3 shows the data of the imaging lens 100a at the wide-end. When the imaging lens 100a is at the tele-end, the interval between the surface S7 and the surface S8 along the optical axis A is changed to 2.8, the interval between the surface S10 and the surface S11 along the optical axis A is changed to 0.1, and the interval between the surface S19 and the surface S20 along the optical axis A is changed to 11.64.

The surfaces S11 and S12 of the imaging lens 100a are aspheric surfaces and may be represented by the aforementioned formula (1). The parameter values of the surfaces S11 and S12 are listed in Table 4. In this embodiment, K and $A_2$ are both zero.

TABLE 4

| Aspheric Parameter | S11 | S12 |
| --- | --- | --- |
| $A_4$ | −2.193312E−04 | 1.069426E−03 |
| $A_6$ | 9.981143E−06 | 4.337512E−05 |
| $A_8$ | −6.027202E−07 | −3.319648E−06 |
| $A_{10}$ | 2.204099E−08 | 2.210877E−07 |

In this embodiment, an Abbe number of each lens in the first lens group G1 is greater than 30. For example, the Abbe number of each of the first, second, third, and fourth lenses L1, L2, L3a, and L4a is greater than 30. In this embodiment, a thickness of each negative lens in the second lens group G2 is less than 0.8 mm, wherein a negative lens means a lens having negative refractive power. For example, the thickness of each of the sixth, eighth, and ninth lens L6, L8a, and L9a is less than 0.8 mm. Moreover, in this embodiment, an absolute value of a difference between Abbe numbers of two lenses nearest to the image side IS among lenses in the second lens group G2 (for example, the ninth and tenth lenses L9a and L10a) is less than 10.

Figure 3:
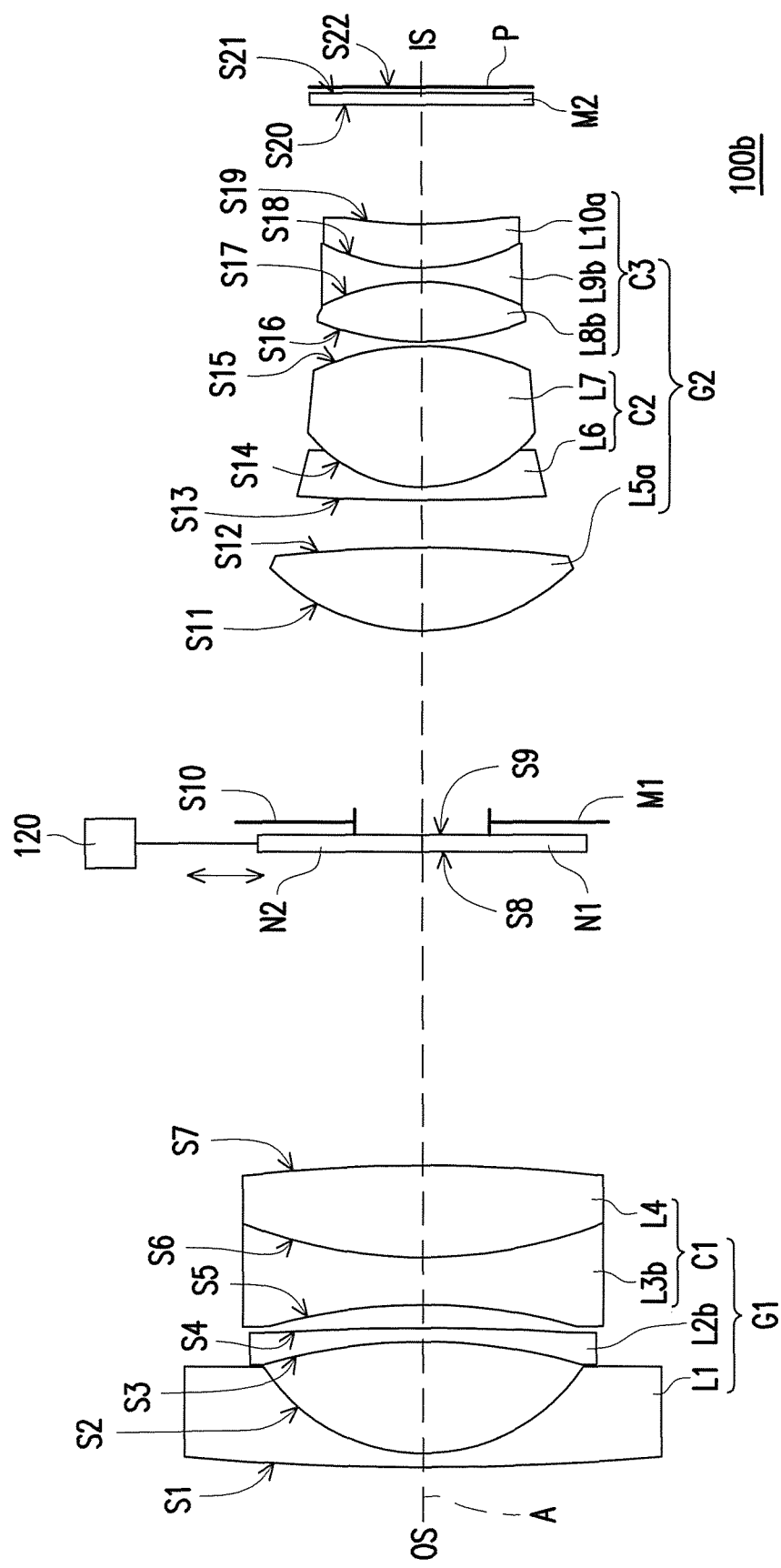
FIG. 3 is a schematic cross-sectional view of an imaging lens according to another embodiment of the invention.

FIG. 3 is a schematic cross-sectional view of an imaging lens according to another embodiment of the invention. Referring to FIG. 3, the imaging lens 100b in this embodiment is similar to the imaging lens 100 in FIGS. 1A and 1B, and the main difference therebetween is as follows. In this embodiment, the refractive powers of the eighth lens L8b, the ninth lens L9b, and the tenth lens L10a are positive, negative, and positive, respectively. Moreover, in this embodiment, the second lens L2b is a negative meniscus lens having a convex surface facing the image side IS, the third lens L3b is a biconcave lens, the fifth lens L5a is a biconvex lens, the eighth lens L8b is a biconvex lens, the ninth lens L9b is a biconcave lens, and the tenth lens L10a is a positive meniscus lens having a convex surface facing the object side OS.

In addition, the imaging lens 100b in this embodiment also includes the first optical element N1, the second optical element N2, and the switching unit 120 as shown in the embodiment of FIGS. 2A and 2B. For the details about the first optical element N1, the second optical element N2, and the switching unit 120, please refer to the embodiment of FIGS. 2A and 2B, and the details are not repeated hereinafter.

An embodiment of the imaging lens 100b is given hereinafter. However, the invention is not limited to the data listed in Tables 5 and 6.

TABLE 5

| Surface | Curvature Radius (mm) | Interval (mm) | Refractive index | Abbe Number | Remarks |
| --- | --- | --- | --- | --- | --- |
| S1 | 89.87 | 0.50 | 1.86 | 29.67 | L1 |
| S2 | 6.65 | 3.94 | | | |
| S3 | −19.87 | 0.50 | 1.70 | 55.53 | L2b |
| S4 | −97.43 | 0.76 | | | |
| S5 | −20.67 | 1.68 | 1.50 | 81.61 | L3b |
| S6 | 15.99 | 3.28 | 1.85 | 23.78 | L4 |
| S7 | −52.58 | 12.13 | | | |
| S8 | Infinity | 0.10 | 1.52 | 64.14 | N1 |
| S9 | Infinity | 0.00 | | | |
| S10 | Infinity | 6.82 | | | M1 |
| S11 | 6.94 | 2.92 | 1.58 | 59.20 | L5a |
| S12 | −23.66 | 1.66 | | | |
| S13 | 57.90 | 0.50 | 1.72 | 34.71 | L6 |
| S14 | 5.10 | 5.00 | 1.44 | 95.10 | L7 |
| S15 | −8.15 | 0.10 | | | |

TABLE 5-continued

| Surface | Curvature Radius (mm) | Interval (mm) | Refractive index | Abbe Number | Remarks |
|---|---|---|---|---|---|
| S16 | 9.23 | 2.12 | 1.50 | 81.61 | L8b |
| S17 | −7.84 | 0.50 | 1.92 | 31.60 | L9b |
| S18 | 6.99 | 1.58 | 1.92 | 18.90 | L10a |
| S19 | 20.82 | 4.20 | | | |
| S20 | Infinity | 0.40 | 1.52 | 64.14 | M2 |
| S21 | Infinity | 0.10 | | | |
| S22 | Infinity | 0.00 | | | P |

In Table 5, the surfaces S8 and S9 are two surfaces of the first optical element N1, and the meaning of the surfaces S1-S7 and S10-S22 can be deduced by analogy from the description of Table 1 and are not repeated hereinafter.

Table 5 shows the data of the imaging lens 100b at the wide-end. When the imaging lens 100b is at the tele-end, the interval between the surface S7 and the surface S8 along the optical axis A is changed to 2.6, the interval between the surface S10 and the surface S11 along the optical axis A is changed to 0.1, and the interval between the surface S19 and the surface S20 along the optical axis A is changed to 10.92.

The surfaces S11 and S12 of the imaging lens 100b are aspheric surfaces and may be represented by the aforementioned formula (1). The parameter values of the surfaces S11 and S12 are listed in Table 6. In this embodiment, K and $A_2$ are both zero.

TABLE 6

| Aspheric Parameter | S11 | S12 |
|---|---|---|
| $A_4$ | −2.727978E−04 | 3.227924E−04 |
| $A_6$ | −2.672673E−06 | −2.089811E−06 |
| $A_8$ | 0.000000E+00 | 1.027229E−07 |
| $A_{10}$ | 0.000000E+00 | 0.000000E+00 |

In this embodiment, the number of positive lenses in the second lens group G2 is greater than the number of negative lenses in the second lens group G2, wherein a positive lens means a lens having positive refractive power, and a negative lens means a lens having negative refractive power. For example, the fifth, seventh, eighth, and tenth lenses L5a, L7, L8b, and L10a are positive lenses, and the sixth and ninth lenses L6 and L9b are negative lenses. Moreover, in this embodiment, the second lens group G2 includes at least one positive lens having an Abbe number less than 20, for example, the tenth lens L10a.

Figure 4A:
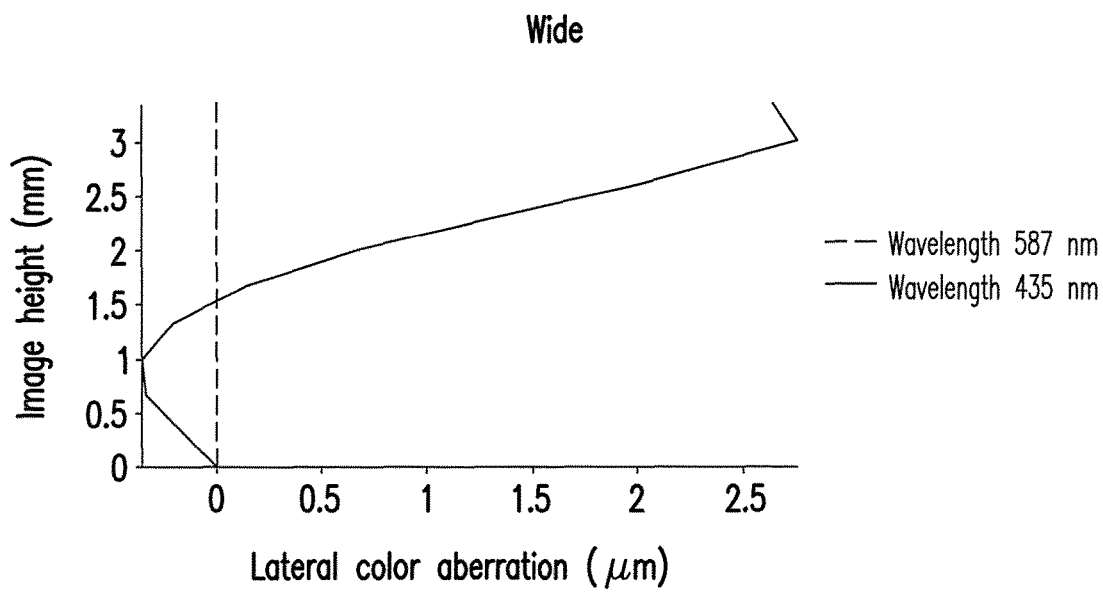
FIGS. 4A and 4B are a lateral color aberration diagram of the imaging lens in FIG. 3 at the wide-end and the tele-end, respectively.
Figure 4B:
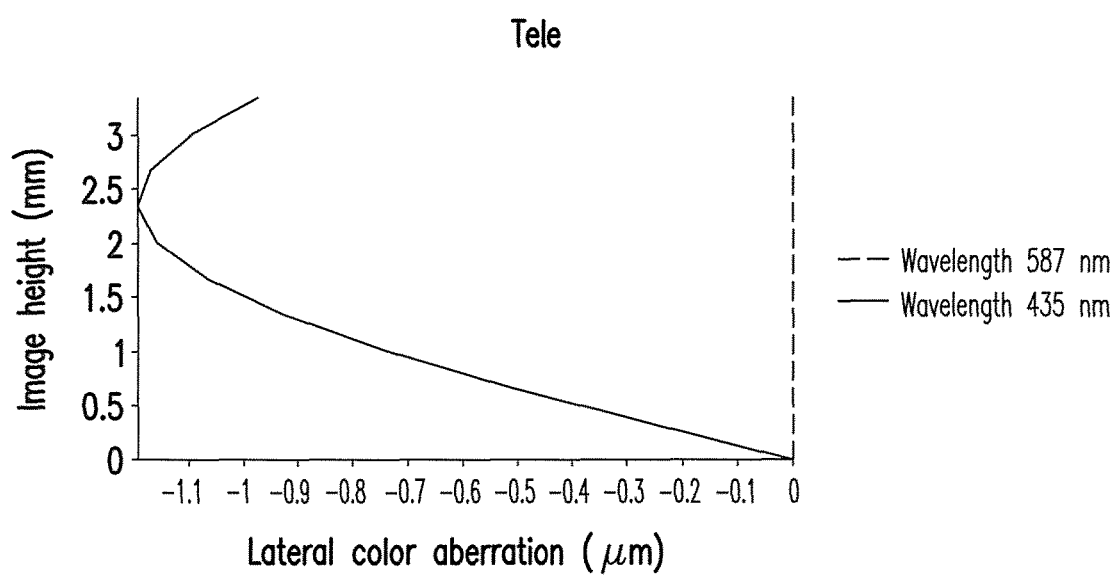
Figure 5:
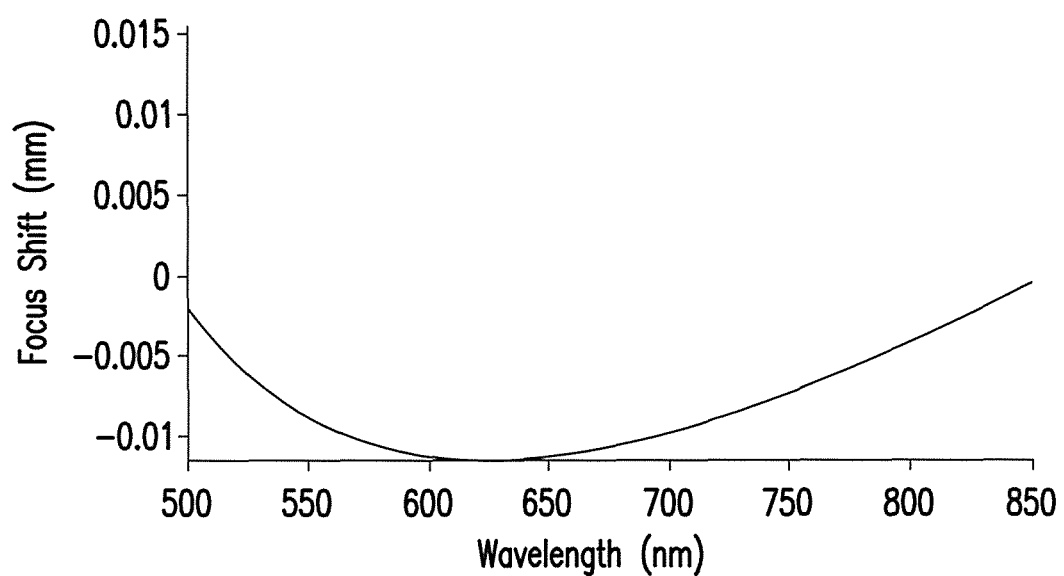
FIG. 5 is a focus shift diagram of the imaging lens in FIG. 3.

FIGS. 4A and 4B are a lateral color aberration diagram of the imaging lens in FIG. 3 at the wide-end and the tele-end, respectively, and FIG. 5 is a focus shift diagram of the imaging lens in FIG. 3. It may be learned from FIGS. 4A and 4B that the lateral color aberration of the light having the wavelength of 435 nm with respect to the light having the wavelength of 587 nm is less than 3 microns at both the wide-end and the tele-end. It may be learned from FIG. 5 that the focus shift of light having the wavelength of 850 nm with respect to green light is less than 0.015 mm, or, for example, less than 0.01 mm. Therefore, the imaging lens 100b really achieves the effect that the position of the focus of IR light and the position of the focus of visible light are substantially the same at the same time, and the color aberration is effectively reduced.

In conclusion, in the imaging lens according to embodiments of the invention, since the cemented lenses are used, or since a focus shift of light having the wavelength of 850 nm with respect to green light is less than 0.015 mm, or, for example, less than 0.01 mm, the imaging lens may achieve the effect that the position of the focus of IR light and the position of the focus of visible light are substantially the same at the same time. Consequently, even in the circumstance that visible light and IR light both exist, the position of the focus of IR light and the position of the focus of visible light may be substantially the same at the same time, so that local image blur may not occur.

It will be apparent to those skilled in the art that various modifications and variations can be made to the structure of the invention without departing from the scope or spirit of the invention. In view of the foregoing, it is intended that the invention covers modifications and variations of this invention provided they fall within the scope of the following claims and their equivalents. Unless otherwise indicated, the ordinal numbers prior to some elements, such as first, second and the like, for example, the first lens group, is used to represent the names of the elements only, not to restrict the order or the quantity of the elements.

What is claimed is:

1. An imaging lens comprising:
   a first lens group disposed between an object side and an image side;
   a second lens group disposed between the first lens group and the image side;
   an aperture stop disposed between the first lens group and the second lens group;
   a first optical element and a second optical element which are disposed between the first lens group and the image side; and
   a switching unit disposed between the first lens group and the image side, the switching unit connected to the first optical element and the second optical element, the switching unit being configured to switch the first optical element or the second optical element into a light path, wherein the first optical element is an invisible light filter,
   wherein the imaging lens comprises at least three cemented lenses, and each of the cemented lenses comprises at least one lens having non-zero refractive power.

2. The imaging lens according to claim 1, wherein each of the cemented lenses comprises at least two lenses, and at least one lens of each of the cemented lenses has an Abbe number greater than 80.

3. The imaging lens according to claim 1, wherein the aperture stop and any one of the first optical element and the second optical element switched into the light path are arranged along an optical axis of the imaging lens.

4. The imaging lens according to claim 1, wherein the first lens group comprises at least one cemented lens, the second lens group comprises at least two cemented lenses, and at least one of the at least two cemented lenses comprised by the second lens group is a triple cemented lens, wherein the second lens group comprises an aspheric lens.

5. The imaging lens according to claim 1, wherein a thickness of the first optical element is substantially the same as a thickness of the second optical element, the invisible light filter is an infrared cut-off filter and the second optical element is a light-transmissive element.

6. The imaging lens according claim 1 further comprising a joint disposed between the second lens group and the image side, and an outside diameter of the joint is less than or equal to 14 inches.

7. The imaging lens according to claim 1, wherein the second lens group comprises a cemented lens nearest to the image side among lenses of the second lens group, and a ratio of a total length of the cemented lens along an optical axis of the imaging lens to a total length of the second lens group along the optical axis is greater than 0.5.

8. The imaging lens according to claim 1, wherein the first lens group comprises at least one lens having an Abbe number less than 20.

9. An imaging lens comprising:
   a first lens group disposed between an object side and an image side;
   a second lens group disposed between the first lens group and the image side;
   an aperture stop disposed between the first lens group and the second lens group;
   a first optical element and a second optical element which are disposed between the first lens group and the image side; and
   a switching unit connected to the first optical element and the second optical element, the switching unit being configured to switch the first optical element or the second optical element into a light path from the first lens group to the image side, wherein the first optical element is an invisible light filter,
   wherein when an incident light having a wavelength of 850 nm passes through the imaging lens to from an image on the image side, a focus shift of the image with respect to green light is less than 0.015 mm.

10. The imaging lens according to claim 9, wherein when another incident light having a wavelength of 435 nm passes through the imaging lens to form another image on the image side, a lateral color aberration of the another image with respect to light having a wavelength of 587 nm is less than 3 microns.

11. The imaging lens according to claim 9, wherein the invisible light filter is an infrared cut-off filter, the second optical element is a light-transmissive element and a thickness of the first optical element is substantially the same as a thickness of the second optical element.

12. The imaging lens according to claim 9, wherein an Abbe number of each lens in the first lens group is greater than 30.

13. The imaging lens according to claim 9, wherein a thickness of each negative lens in the second lens group is less than 0.8 mm.

14. The imaging lens according to claim 9, wherein an absolute value of a difference between Abbe numbers of two lenses nearest to the image side among lenses in the second lens group is less than 10.

15. An imaging lens comprising:
   a first lens group disposed between an object side and an image side;
   a second lens group disposed between the first lens group and the image side; and
   an aperture stop disposed between the first lens group and the second lens group,
   wherein the imaging lens comprises at least three cemented lenses, each of the cemented lenses comprises at least one lens having non-zero refractive power, and at least one lens of each of the cemented lenses has an Abbe number greater than 80.

16. The imaging lens according to claim 15, wherein the first lens group comprises at least one cemented lens, the second lens group comprises at least two cemented lenses, and at least one of the at least two cemented lenses comprised by the second lens group is a triple cemented lens, wherein the second lens group comprises an aspheric lens.

17. The imaging lens according claim 15 further comprising a joint disposed between the second lens group and the image side, and an outside diameter of the joint is less than or equal to 14 inches.

18. The imaging lens according to claim 15, wherein when an incident light having a wavelength of 850 nm passes through the imaging lens to from an image on the image side, a focus shift of the image with respect to green light is less than 0.015 mm.

19. The imaging lens according to claim 15, wherein when an incident light having a wavelength of 435 nm passes through the imaging lens to form an image on the image side, a lateral color aberration of the image with respect to light having a wavelength of 587 nm is less than 3 microns.

20. The imaging lens according to claim 15, wherein the number of positive lenses in the second lens group is greater than the number of negative lenses in the second lens group.

21. The imaging lens according to claim 15, wherein the second lens group comprises at least one positive lens having an Abbe number less than 20.

* * * * *